Dec. 6, 1927.  1,651,815

H. R. GIBBONS

ANTIFRICTION BEARING

Filed Aug. 24, 1925

INVENTOR:
HAROLD R. GIBBONS,
BY
HIS ATTORNEY.

Patented Dec. 6, 1927.

1,651,815

UNITED STATES PATENT OFFICE.

HAROLD R. GIBBONS, OF CHATHAM, NEW JERSEY, ASSIGNOR TO GENERAL MOTORS CORPORATION, OF DETROIT, MICHIGAN, A CORPORATION OF DELAWARE.

ANTIFRICTION BEARING.

Application filed August 24, 1925. Serial No. 51,920.

This invention relates to antifriction bearings and is herein shown, by way of example, as embodied in a unit handling roller bearing assembly.

An object of the invention is to provide an improved roller bearing composed of a small number of parts that are easily assembled and disassembled. Another object is to provide an inexpensive roller bearing in which the rollers are retained in an outer race as a unit, the retaining means eliminating riveted joints and such undesirable features.

To these ends and also to improve generally upon devices of the character indicated the invention consists in the various matters hereinafter described and claimed.

Figures 1, 2:
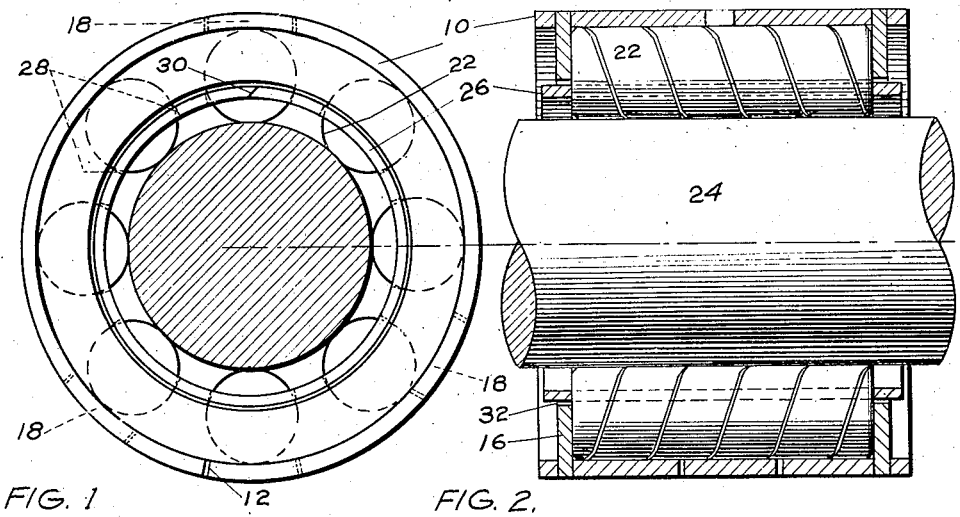
Figure 3:
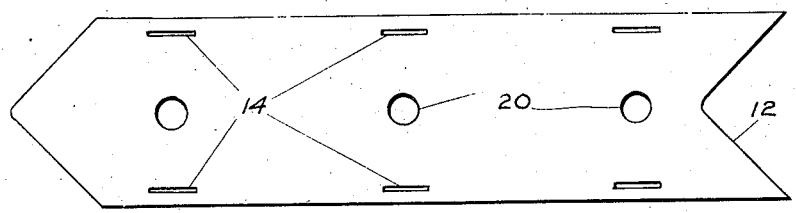
Figure 4:
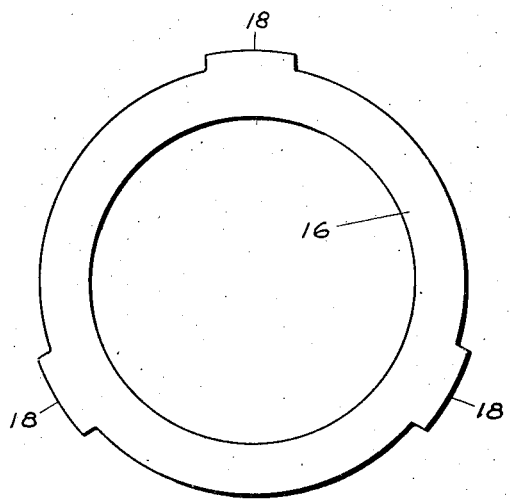

In the drawings, Figure 1 is an end view. Figure 2 is a transverse central section. Figure 3 is a plan view of the outer race blank before it is bent to form a split sleeve. Figure 4 is a detail view of one of the end rings.

The numeral 10 indicates an outer raceway formed of a planished steel blank bent to make a split sleeve having a fish-tail joint 12. The sleeve has a plurality of pairs of slots 14 and is arranged to wrap around a pair of end rings 16 which have lugs 18 to enter the slots for making an interlocking connection. The slots are a little longer circumferentially than the lugs so that the lugs will properly enter them in the wrapping process. The split sleeve is arranged to slip into any sort of cylindrical outer housing (not shown) which holds it compressed onto the end rings. Oil openings 20, for cooperation with an oil channel in the housing, may be punched in the sleeve. The sleeve encircles a circular series of cylindrical rollers 22 which may be solid or of the hollow, wound type shown and the end rings abut the flat ends of the rollers and prevent them from moving longitudinally in the sleeve.

There is provision for holding the rollers outwardly in the sleeve to make a unit handling bearing assembly when the shaft 24 or other inner race is not in place, as during shipment. This comprises a retaining band 26 having rectangular roller spacing and guiding openings 28. The band 26 is arranged in a circle smaller than the circle through the centers of the rollers so that the rollers are held against inward escape and are guided by the front and rear edges of the openings. The band 26 may be formed by punching a sleeve, or as shown, by punching the openings in a flat blank and turning the blank into a ring and welding the ends as at 30. The band is of smaller diameter than the end rings 16 and extends within and past them, a little clearance being left at 32 to allow the retainer to float on the rollers. By bending outwardly the ends of the split sleeve, any of the parts of the bearing is readily removable for any purpose.

Although the invention has been described by reference to an illustrated embodiment, it should be understood that, in its broader aspects, the invention is not necessarily limited to the specific construction selected for mere illustrative purposes.

I claim:

1. In a bearing, a bendable split sleeve forming an outer raceway, a circular series of rollers within the sleeve, and a pair of rings arranged within the ends of the sleeve to abut the ends of the rollers, said rings and sleeve having interlocking means to allow the sleeve to be wrapped around and detachably connected to the rings; substantially as described.

2. In a unit handling bearing assembly, a bendable split sleeve forming an outer raceway, a circular series of rollers within the sleeve, a pair of rings arranged within the ends of the sleeve to abut the ends of the rollers, said rings having outwardly extending lugs and said sleeve having corresponding slots, whereby the sleeve can be wrapped around and detachably connected with the rings; substantially as described.

3. In a unit handling bearing assembly, a bendable split sleeve forming an outer raceway, a circular series of cylindrical rollers within the sleeve, means surrounding and spacing the rollers and holding them against inward escape in the absence of an inner race, and a pair of rings detachably secured within the sleeve and forming abutments for the ends of the rollers; substatnially as described.

4. In a unit handling bearing assembly, a bendable split sleeve forming an outer raceway, a circular series of rollers within the sleeve, a pair of rings arranged within the ends of the sleeve to abut the ends of the rollers, a retaining band arranged within the rings and having roller guiding openings, said rings and sleeve having interlocking means to form a detachable connection; substantially as described.

5. In a unit handling bearing assembly, a circular series of rollers, an encircling sleeve forming an outer raceway for the rollers and having a series of spaced slots, an end ring fitting within the sleeve and having a series of lugs to engage said slots, one of said members being split to enable the members to be detachably connected, and means for spacing the rollers and holding them against inward escape; substantially as described.

In testimony whereof I hereunto affix my signature.

HAROLD R. GIBBONS.